(12) United States Patent
Friend et al.

(10) Patent No.: US 11,796,018 B1
(45) Date of Patent: Oct. 24, 2023

(54) VEHICLE WHEEL TORQUE BRACES AND METHODS OF INHIBITING VEHICLE WHEEL ROTATION

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US); David A. Britton, Florence, KY (US); Billy D. Dooley, Irvine, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/717,348

(22) Filed: Apr. 11, 2022

(51) Int. Cl.
*B60T 3/00* (2006.01)
*F16D 63/00* (2006.01)
*B60B 30/02* (2006.01)

(52) U.S. Cl.
CPC .............. *F16D 63/00* (2013.01); *B60B 30/02* (2013.01)

(58) Field of Classification Search
CPC ....... F16D 63/00; F16D 63/006; B60B 30/02; B60T 1/04; B60T 1/005; B60T 3/00
USPC ..................................................... 188/29, 31
See application file for complete search history.

(56) References Cited

U.S. PATENT DOCUMENTS

| | | | | |
|---|---|---|---|---|
| 2,823,769 | A * | 2/1958 | Gamble | B60T 1/04 188/29 |
| 2,944,636 | A * | 7/1960 | Rockwell | B60T 1/04 188/29 |
| 4,186,823 | A * | 2/1980 | White, Jr. | B60T 3/00 188/32 |
| 5,381,680 | A * | 1/1995 | Rauch, Jr. | B60T 3/00 188/74 |
| 5,490,582 | A * | 2/1996 | Trowbridge | B60T 3/00 188/74 |
| 5,839,863 | A * | 11/1998 | Johansson | B60P 3/077 410/94 |
| 9,126,775 | B2 | 9/2015 | Brooks et al. | |
| 9,212,797 | B2 * | 12/2015 | Jeong | B65G 69/005 |
| 10,322,509 | B2 | 6/2019 | Hong et al. | |
| 11,046,298 | B1 * | 6/2021 | Desmarais | G01G 19/021 |
| 11,097,698 | B2 * | 8/2021 | Stieger | B60T 3/00 |
| 2007/0050999 | A1 * | 3/2007 | Milner | B65G 69/2882 33/286 |
| 2013/0223048 | A1 * | 8/2013 | Jeong | B60P 3/077 362/183 |

(Continued)

FOREIGN PATENT DOCUMENTS

GB      2521529 A    1/2015
IN  202141001001 A   2/2021

*Primary Examiner* — Thomas W Irvin
(74) *Attorney, Agent, or Firm* — Dinsmore & Shohl LLP

(57) ABSTRACT

A vehicle wheel torque brace for inhibiting rotation of a vehicle wheel includes a brace body including a relatively thick stopper portion and a relatively thin wedge portion that is stepped down in thickness relative to the wedge portion. The wedge portion decreases in thickness from one side of the brace body to an opposite side of the brace body. A contact pad is carried by the wedge portion. The contact pad and wedge portion are shaped and sized to be wedged between a tire of the vehicle wheel and a strut assembly to inhibit rotation of the vehicle wheel.

17 Claims, 3 Drawing Sheets

(56) References Cited

U.S. PATENT DOCUMENTS

| | | | |
|---|---|---|---|
| 2014/0325770 A1* | 11/2014 | Somers | B66F 7/243 |
| | | | 14/69.5 |
| 2018/0170100 A1 | 6/2018 | Hardison | |
| 2019/0329742 A1* | 10/2019 | Stieger | B60T 3/00 |
| 2021/0170997 A1* | 6/2021 | Widgery | B64F 1/16 |
| 2021/0366323 A1* | 11/2021 | Buell | G09F 21/049 |

* cited by examiner

VEHICLE WHEEL TORQUE BRACES AND METHODS OF INHIBITING VEHICLE WHEEL ROTATION

TECHNICAL FIELD

The present specification generally relates to torque braces and, more specifically, to vehicle wheel torque braces and methods of inhibiting vehicle wheel rotation.

BACKGROUND

During vehicle assembly, it may be the case that certain assembly operations are performed while the vehicle is suspended above ground. Because of this, assembly operations on or around wheels of the vehicle may cause the vehicle wheels to spin. This spinning of the vehicle wheels may be undesirable, particularly when an assembly operation is being performed on the wheel itself. For example, it may be undesirable for the vehicle wheel to spin when torqueing or checking torque of lug nuts of the wheel.

What is needed are torque braces that can be used to inhibit spinning of vehicle wheels during a lug nut torqueing operation.

SUMMARY

In accordance with one embodiment, a vehicle wheel torque brace for inhibiting rotation of a vehicle wheel includes a brace body including a relatively thick stopper portion and a relatively thin wedge portion that is stepped down in thickness relative to the stopper portion. The wedge portion decreases in thickness from one side of the brace body to an opposite side of the brace body. A contact pad is carried by the wedge portion. The contact pad and wedge portion are shaped and sized to be wedged between a tire of the vehicle wheel and a strut assembly to inhibit rotation of the vehicle wheel.

In another embodiment, a method of inhibiting rotation of a wheel of a vehicle while the vehicle is suspended above ground is provided. The method includes positioning a vehicle wheel torque brace at the wheel of the vehicle. The vehicle wheel torque brace includes a brace body including a relatively thick stopper portion and a relatively thin wedge portion that is stepped down in thickness relative to the wedge portion. The wedge portion decreases in thickness from one side of the brace body to an opposite side of the brace body. A contact pad is carried by the wedge portion. The contact pad and wedge portion are shaped and sized to be wedged between a tire of the vehicle wheel and a strut assembly to inhibit rotation of the vehicle wheel. Wedging the wedge portion between the wheel and a strut assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Embodiments described herein are directed to vehicle wheel torque braces that can be used when it is desired to inhibit rotation of a vehicle wheel during operations on or around the vehicle wheel. The vehicle wheel torque brace includes a brace body and a contact pad that is softer than the brace body. The brace body includes a relatively thick stopper portion and a relatively thin wedge portion that is stepped down in thickness relative to the wedge portion. The wedge portion decreases in thickness from one side of the brace body to an opposite side of the brace body. A handle is connected to an end of the stopper portion that is opposite the wedge portion. The handle may include opposite ends that intersect and terminate at the stopper portion forming a closed loop. The contact pad may be formed on or mounted upon the wedge portion. In some embodiments, a footprint of the contact pad covers at least 50 percent of a surface of the wedge portion. The contact pad may be formed of a softer material than the brace body in order to come into contact with part of a strut assembly that is mounted to the vehicle wheel. The wedge portion is shaped and sized to be wedged between a tire of the vehicle wheel and a coil spring of the strut assembly to inhibit rotation of the vehicle wheel.

Figure 3:
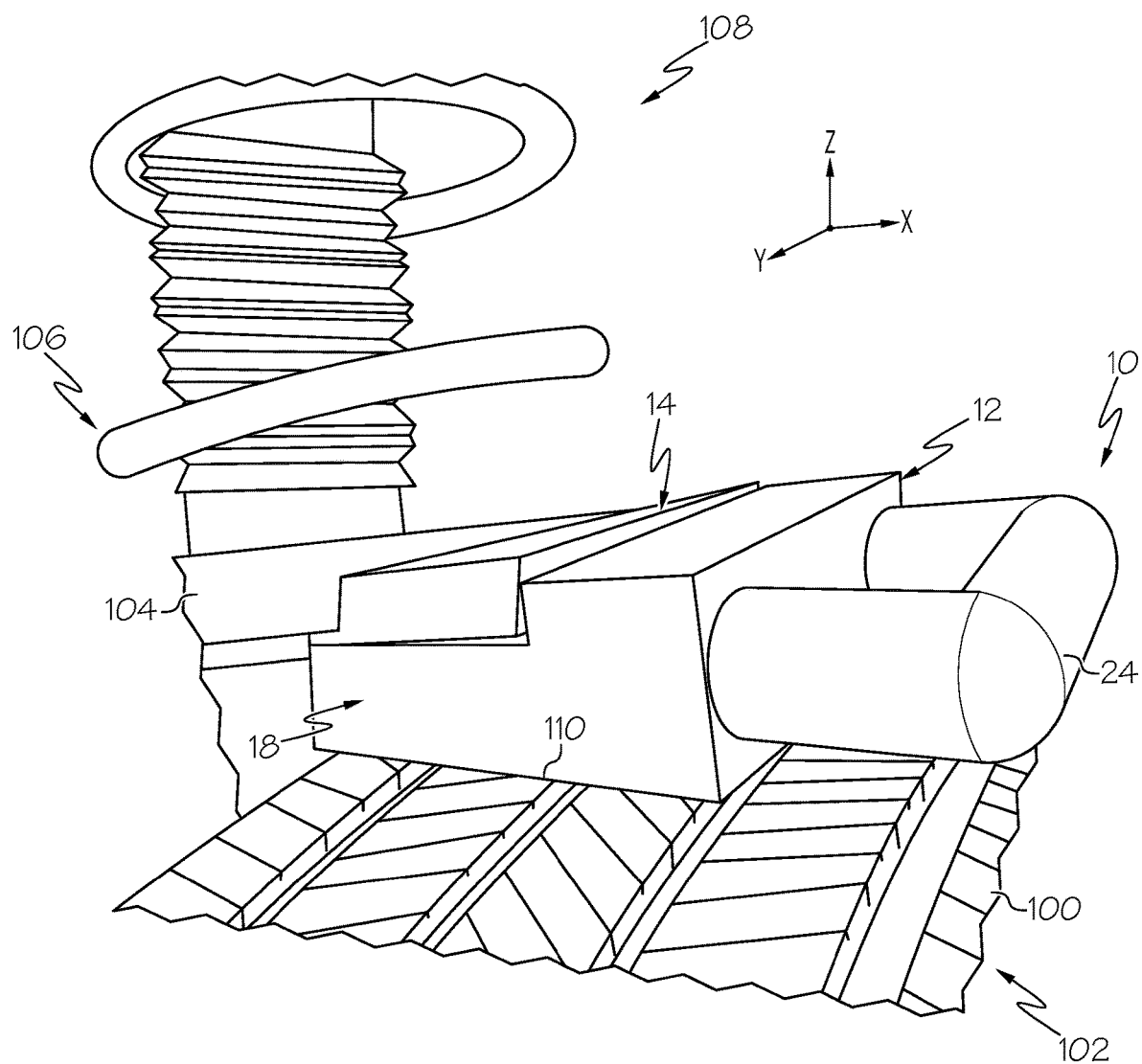
FIG. 3 depicts the vehicle wheel torque brace of FIG. 1 with the contact pad of FIG. 2 in use, according to one or more embodiments shown and described herein.

As used herein, the term "vehicle longitudinal direction" refers to the forward-rearward direction of the vehicle (i.e., in the +/− vehicle Y direction depicted in FIG. 3). The term "vehicle lateral direction" refers to the cross-vehicle direction (i.e., in the +/− vehicle X direction depicted in FIG. 3), and is transverse to the vehicle longitudinal direction. The term "vehicle vertical direction" refers to the upward-downward direction of the vehicle (i.e., in the +/− vehicle Z-direction depicted in FIG. 3). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in a direction with respect to a vehicle centerline. The term "inboard" or "inward" as used herein refers to the relative location of a component in a direction with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Figure 1:
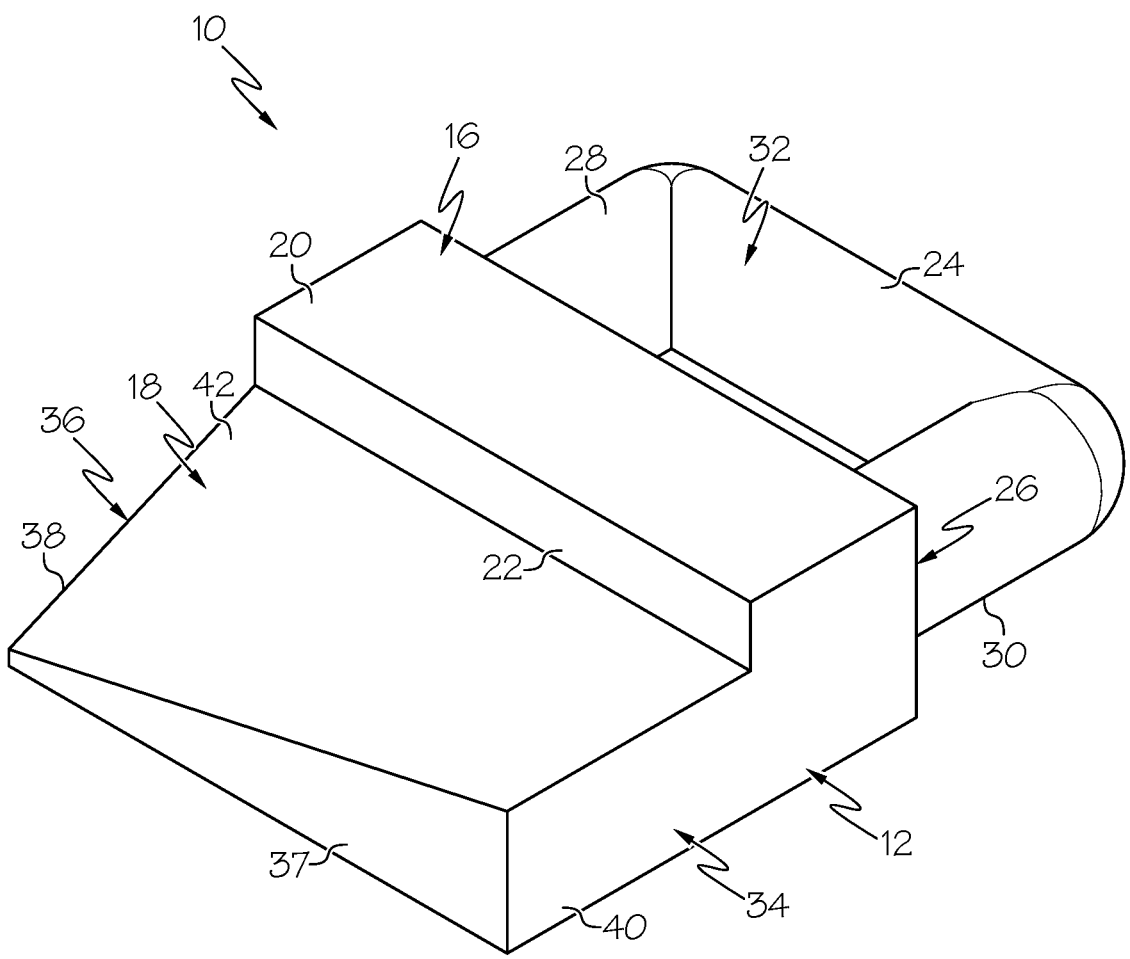
FIG. 1 depicts a perspective view of a brace body of a vehicle wheel torque brace, according to one or more embodiments shown and described herein.
Figure 2:
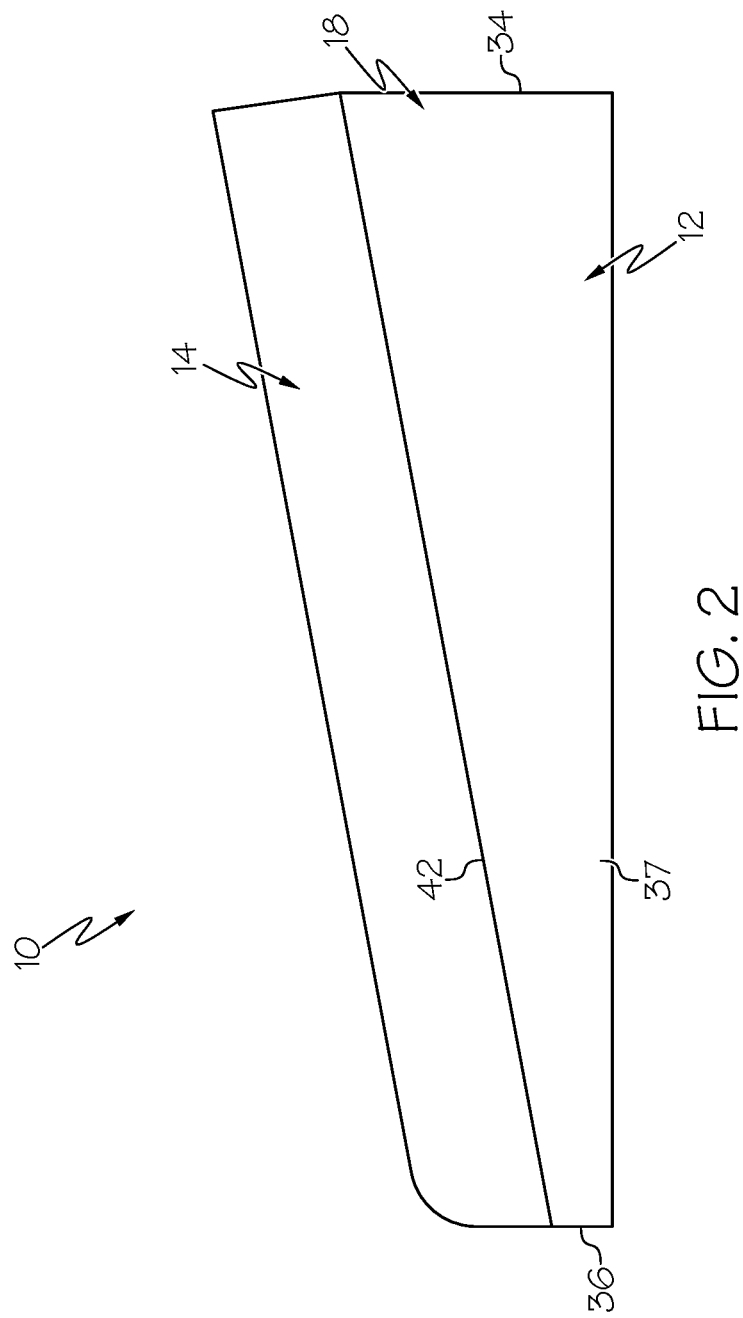
FIG. 2 depicts an end of the brace body of FIG. 1 with a contact pad, according to one or more embodiments shown and described herein.

Referring to FIGS. 1 and 2, a vehicle wheel torque brace 10 includes a brace body 12 and a contact pad 14. In FIG. 1, only the brace body is shown 12 without the contact pad 14. FIG. 2 illustrates an end view of the brace body 12 with the contact pad 14. The brace body 12 includes a relatively thick stopper portion 16 and a relatively thin wedge portion 18. The stopper portion 16, in the illustrated example, is rectangular in cross-section, forming a box-like shape having squared edges. The wedge portion 18 is stepped down from a upper surface 20 of the stopper portion 16 at a stopper wall 22. A handle 24 is connected to an end 26 of the stopper portion 16 that is opposite the wedge portion 18. The handle 24 may include opposite ends 28 and 30 that intersect and terminate at the stopper portion 16 forming a closed loop with an opening 32 extending therethough that is sized to receive a portion of a user's hand.

The wedge portion 18 decreases in thickness from one side 34 of the brace body 12 to an opposite side 36 of the brace body 12 and also from the stopper portion 16 to a terminal edge 37 of the wedge portion 18. In use, this side-to-side direction is oriented in the vehicle longitudinal direction. The decrease in thickness of the wedge portion 18 forms a ramp-like shape, having a relatively thin side 38 and a relatively thick side 40. Referring particularly to FIG. 2, the contact pad 14 may be formed on or mounted on the wedge portion 18. Either way, the contact pad 14 is carried on the wedge portion 18. In some embodiments, a footprint of the contact pad 14 covers a majority of an upper surface 42 of the wedge portion 18, such as at least 50 percent, such as 75 percent, such as 100 percent.

The contact pad 14 may be formed of a softer material than the brace body 12. For example, the contact pad 14 may be formed by a urethane material and the brace body 12 may be formed by a harder plastic material. In some embodiments, the contact pad 14 may have a substantially constant thickness or may increase and decrease in thickness also forming a ramp-like shape. The contact pad 14 is formed by a softer material in order to come into contact with part of a strut assembly that is mounted to a vehicle wheel. The wedge portion 18 is shaped and sized to be wedged between a tire of the vehicle wheel and a coil spring of a strut assembly to inhibit rotation of a vehicle wheel, as will be described in greater detail below. The brace body 12 and the contact pad 14 may be formed by any suitable method. For example, the brace body 12 may be 3-D printed and the contact pad 14 may be mounted thereto using fasteners and/or adhesives. In some embodiments, the contact pad 14 may be formed integral with the brace body 12 (e.g., by 3-D printing).

Referring now to FIG. 3, the vehicle wheel torque brace 10 is shown in operation. To use the vehicle wheel torque brace 10, a user manually grasps the vehicle wheel torque brace 10 by the handle 24. The handle 24 is oriented outboard of the wedge portion 18 and contact pad. The vehicle wheel torque brace 10 is then moved in the vehicle transverse direction such that the wedge portion 18 and the contact pad 14 are together wedged between a tire 100 of vehicle wheel 102 and a coil 104 of coil spring 106. The coil spring 106 is part of a strut assembly 108 that is mounted to the vehicle wheel 102. When the wedge portion 18 and contact pad 14 are wedged between the tire 100 and the coil 104, a bottom surface 110 of the brace body 12 frictionally engages the tire 100 and inhibits rotation of the tire 100.

The above-described vehicle wheel torque braces are used to inhibit rotation of vehicle wheels during various operations on the vehicle wheels. For example, the vehicle wheel torque braces can be used during torqueing of lug nuts or while removing stripped lug nuts while the vehicle are suspended above the ground. The vehicle wheel torque braces can be used on multiple vehicle models, on both sides of the vehicle and on front or rear wheels. The contact pad can reduce the potential for marking or chipping coating on the coils springs.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle wheel torque brace for inhibiting rotation of a vehicle wheel, comprising:
   a brace body comprising a relatively thick stopper portion and a relatively thin wedge portion that is stepped down in thickness relative to the stopper portion, the wedge portion decreases in thickness in a widthwise direction from one side of the brace body to an opposite side of the brace body; and
   a contact pad is carried by the wedge portion, the contact pad and wedge portion are shaped and sized to be wedged between a tire of the vehicle wheel and a strut assembly to inhibit rotation of the vehicle wheel;
   wherein the wedge portion decreases in thickness in a lengthwise direction from the stopper portion to a terminal edge of the wedge portion that extends between the one side of the brace body and the opposite side of the brace body.

2. The vehicle wheel torque brace of claim 1 further comprising a handle connected to an end of the stopper portion that is opposite the wedge portion.

3. The vehicle wheel torque brace of claim 2, wherein the handle comprises opposite ends that intersect and terminate at the stopper portion forming a closed loop.

4. The vehicle wheel torque brace of claim 1, wherein the contact pad is formed of a material that is softer than material forming the brace body.

5. The vehicle wheel torque brace of claim 1, wherein the brace body is formed by 3-D printing.

6. The vehicle wheel torque brace of claim 1, wherein the contact pad is formed separately from the brace body and is attached thereto.

7. The vehicle wheel torque brace of claim 1, wherein the contact pad is formed as an integral part of the brace body.

8. The vehicle wheel torque brace of claim 1, wherein the wedge portion decreases in thickness from the stopper portion to a terminal edge of the wedge portion.

9. A method of inhibiting rotation of a wheel of a vehicle while the vehicle is suspended above ground, the method comprising:
   positioning a vehicle wheel torque brace at the wheel of the vehicle, the vehicle wheel torque brace comprising:
      a brace body comprising a relatively thick stopper portion and a relatively thin wedge portion that is stepped down in thickness relative to the wedge portion, the wedge portion decreases in thickness from one side of the brace body to an opposite side of the brace body; and
      a contact pad is carried by the wedge portion, the contact pad and wedge portion are shaped and sized to be wedged between a tire of the vehicle wheel and a strut assembly to inhibit rotation of the vehicle wheel; and
   wedging the wedge portion between the wheel and a strut assembly.

10. The method of claim 9 further comprising applying a torque to the wheel, the vehicle wheel torque brace inhibiting rotation of the wheel.

11. The method of claim 9, wherein the step of positioning includes grasping a handle connected to an end of the stopper portion that is opposite the wedge portion.

12. The method of claim 11, wherein the handle comprises opposite ends that intersect and terminate at the stopper portion forming a closed loop.

13. The method of claim 9, wherein the contact pad is formed of a material that is softer than material forming the brace body.

14. The method of claim 9 further comprising 3-D printing the brace body.

15. The method claim 9 further comprising forming the contact pad separately from the brace body and attaching the contact pad to the brace body.

16. The method of claim 9 further comprising forming the contact pad as an integral part of the brace body.

17. The method of claim 9, wherein the wedge portion decreases in thickness from the stopper portion to a terminal edge of the wedge portion.

\* \* \* \* \*